March 16, 1965 W. D. CASSEL 3,173,402
AUTOMATIC CATTLE SPRAYER
Filed Aug. 26, 1963 3 Sheets-Sheet 1

INVENTOR
WALTER D. CASSEL
BY Donald F. Voss
ATTORNEY

March 16, 1965 W. D. CASSEL 3,173,402
AUTOMATIC CATTLE SPRAYER
Filed Aug. 26, 1963 3 Sheets-Sheet 3

# United States Patent Office 3,173,402
Patented Mar. 16, 1965

3,173,402
AUTOMATIC CATTLE SPRAYER
Walter D. Cassel, R.F.D. 1, Dover, Minn.
Filed Aug. 26, 1963, Ser. No. 304,409
4 Claims. (Cl. 119—157)

This invention relates to an automatic cattle sprayer and more particularly to an automatic cattle sprayer where the cattle both pressurize the fluid to be sprayed and trigger the spraying apparatus when they are in the proper position to be sprayed.

In this invention cattle enter a spray chute one at a time. A ramp type platform is pivotally mounted in the spray chute. When the cattle walk upon the platform the liquid to be sprayed is drawn from a reservoir and is pressurized as the platform is pivoted by the cattle. The liquid does not discharge at this time to spray upon the cattle. There are two good reasons for not permitting the liquid to discharge at this time. One, in this invention the cattle themselves pressurize the liquid, hence, if the liquid were permitted to discharge right away the pressure would be uneven and the spray would be less effective. The second reason is that the cattle should be properly positioned in the spray chute prior to the discharge of the liquid. The trigger mechanism for operating a valve which controls the discharge of the pressurized fluid is located intermediate of the entry and exit points of the spray chute. The trigger mechanism is also operated by the cattle as they move into position upon the pivotally mounted platform. Hence, the fluid is first pressurized and then discharged, both actions being accomplished by the cattle. This arrangement provides an improved, low cost, fully automatic catle sprayer.

Automatic cattle sprayers of the prior art either do not have a pressurized system or the pressurized system is externally provided, such as by means of a compressor. Such devices are not only more expensive but not as efficient.

Accordingly, the prime object of the invention is to provide an improved fully automatic cattle sprayer.

Another very important object of the invention is to provide a fully automatic cattle sprayer which utilizes the movement of the cattle to pressurize the fluid to be sprayed and thereafter upon further movement of the cattle into the proper position, the cattle function to operate a trigger mechanism which controls the discharge of the pressurized fluid which then sprays upon them.

Still another very important object of the invention is to provide a fully automatic cattle sprayer which is relatively inexpensive.

A further object of the invention is to provide a fully automatic cattle sprayer which can be easily constructed.

Still an additional object of the invention is to provide a fully automatic cattle sprayer which requires relatively little maintenance.

These and other objects of the invention, together with the advantages thereof will become apparent in the details of construction and operation as more fully hereinafter described and claimed.

Figure 1:
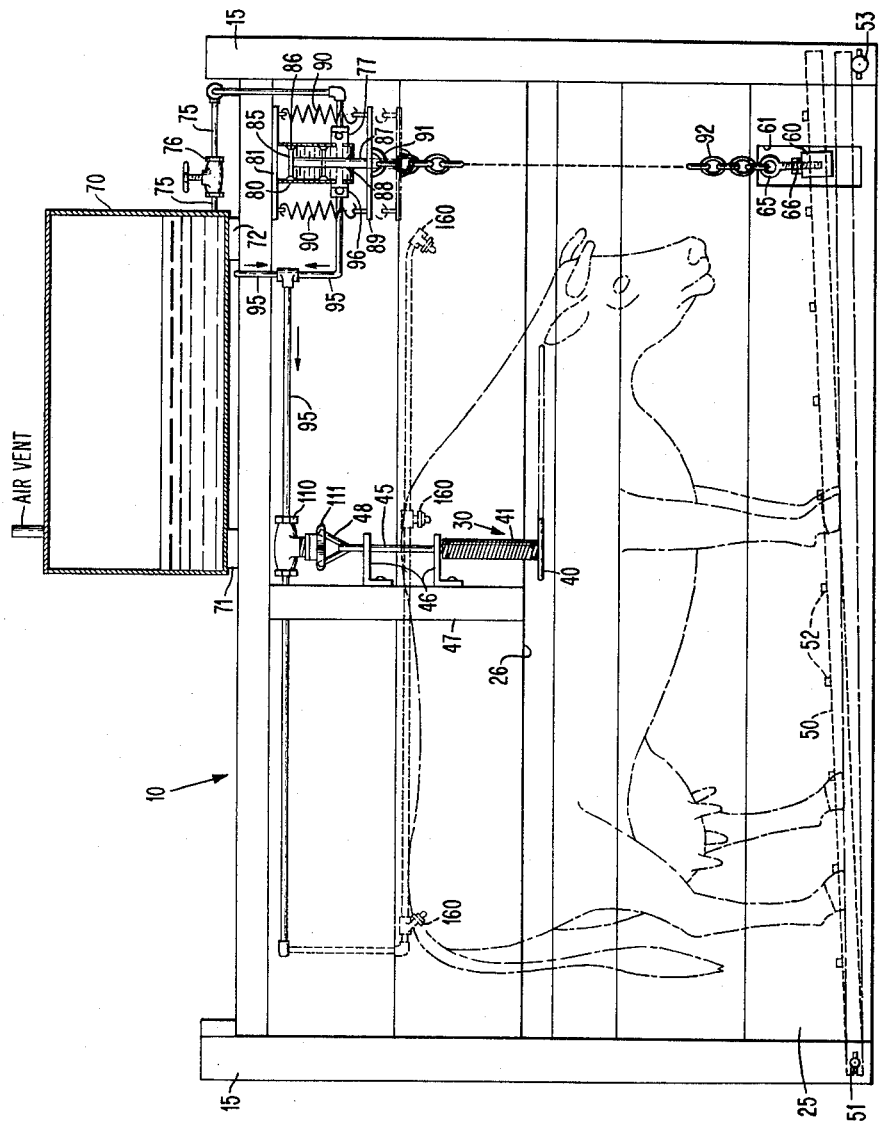
FIGURE 1 is a front elevational view showing the spray chute and the automatic cattle spraying apparatus.
Figure 2:
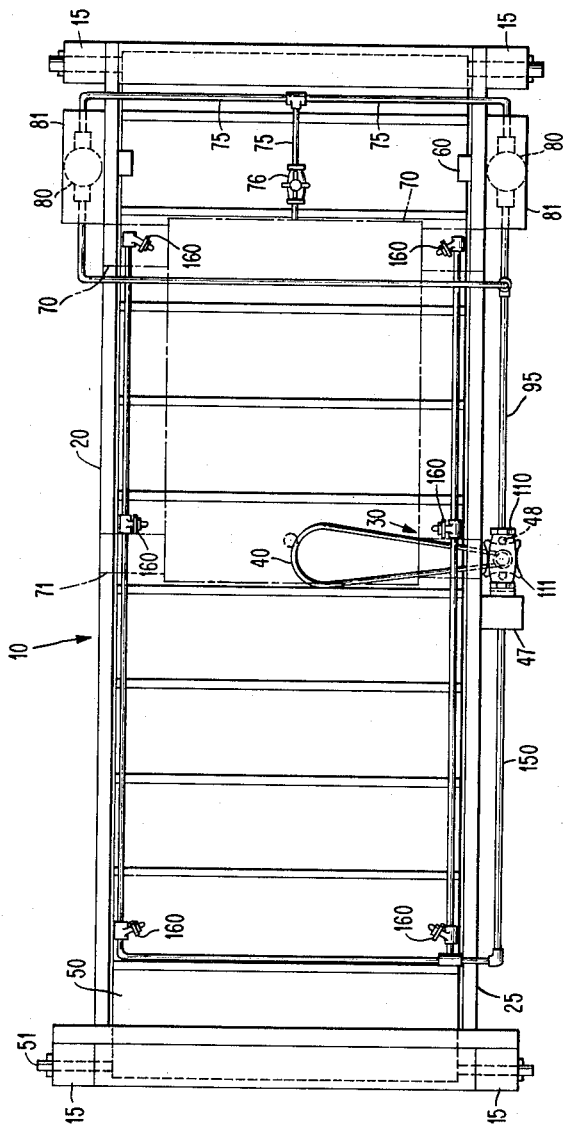
FIGURE 2 is a plan view of the spray chute and automatic cattle spraying apparatus.
Figure 3:
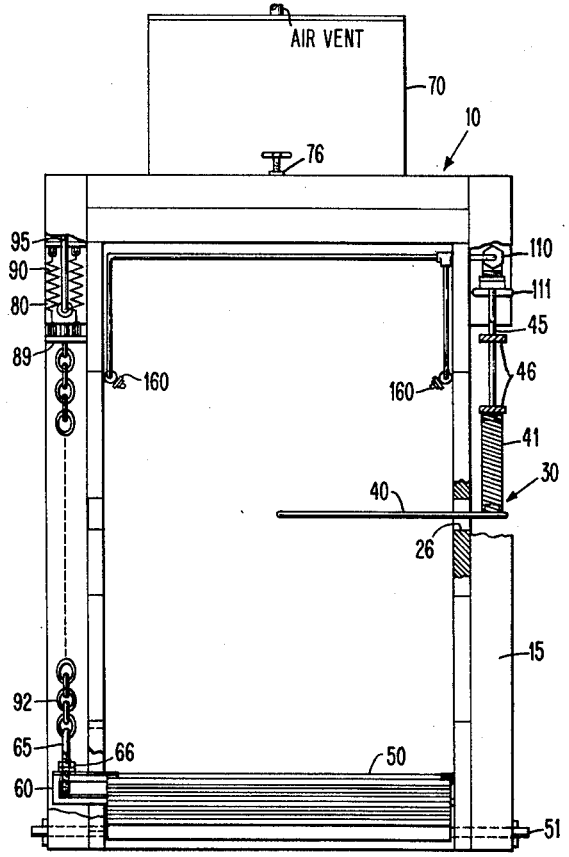
FIGURE 3 is a left end elevational view of the spray chute and automatic cattle spraying apparatus with portions thereof broken away to more clearly show the trigger mechanism and the connection between the pivotally mounted platform and one of the pumps.

With reference to the drawings and particularly to the FIGURE 1, the invention is illustrated by way of example as a spray chute 10 which is opened at opposite ends so that cattle may malk clear through from either end, but preferably, from the left hand end as shown in FIG. 1. The spray chute 10 is generally rectangular and consists of four vertically extending support members 15 at each corner of the rectangle so formed as shown in FIG. 2. The vertical extending members 15 can be constructed from any suitable material such as wood. The sides 20 and 25 of spray chute 10 are laterally spaced from each other and attached to the vertical members 15. The sides 20 and 25 also may be constructed from any suitable material such as wood. They may be constructed either in one or several pieces. However, in this example, an opening 26 is provided in side 25 to permit the actuator bar 40 of trigger mechanism 30 to extend therethrough.

Platform 50, FIG. 1, is pivotally mounted at one end between the vertical members 15 at their base end. Pins 51 extend through the vertical members 15 and into the platform 50 so as to provide a pivot for platform 50. Platform 50 is shown in this example as also being provided with cleats 52 which function to improve the footing of the cattle as they walk thereon. The platform 50 may also be constructed from any suitable material such as wood.

A bracket 60 extends from the sides of the platform 50 near the end opposite of the pivotally mounted end of the platform. The bracket 60 can be two separate pieces extending from beneath and out to the sides of the platform 50, the brackets also being attached to the underside of platform 50, or they can be one continuous piece which is attached to the underside of platform 50 and extending across the same and outwardly to the sides. Hence, since the brackets 60 are attached to the platform 50 they will move therewith. The sides 20 and 25 are provided with a generally rectangular opening 61 which permits the brackets 60 to move with the platform 50 as it is pivoted. The brackets 60 are threaded to receive I bolts 65. The I bolts 65 can be threaded into brackets 60 to any desired depth, and as it will be seen shortly, the depth to which the I bolts 65 are threaded into brackets 60 determines the amount of fluid discharged. The I bolts 65 when threaded into brackets 60 to the desired depth, are then held in place by lock nuts 66.

The fluid to be sprayed is contained in a reservoir 70. The reservoir 70 suitably mounted on top of the spray chute 10 by members 71 and 72, which are longitudinally spaced from each other and extend transversely to rest upon the tops of sides 20 and 25. The fluid to be sprayed is pressurized within cylinders 80 which depend from support plates 81, there being a pair of cylinders in this example. The cylinders 80 are substantially identical in construction and therefore only one of the cylinders will be described. It should be understood that the number of cylinders and the size of the cylinders is a matter of choice. A fluid conductor 75 is connected between the reservoir 70 and the inlet to cylinder 80. A manually controlled shut off valve 76 is suitably connected to the fluid conductor to permit shut off of fluid from reservoir 70.

A check valve 77 is connected between the inlet to cylinder 80 and the fluid conductor 75. This arrangement permits fluid to flow into cylinder 80. However, when fluid is to be discharged from the cylinder 80 it will not flow back through conductor 75 because of the check valve 77. A piston 85 is reciprocally mounted within cylinder 80 and is provided with a leather shoe 86 or other suitable sealing means such as an O ring seal. The piston 85 is connected to one end of a piston rod 87 which extends downwardly through the bottom of cylinder 80. A washer or suitable packing 88 prevents leakage of fluid around the piston rod 87 where the same extends through bottom of cylinder 80. The other end of the piston rod 87 is connected to the longitudinal plate 89 near the end thereof. The springs 90 function to hold the piston 85 in its upward position and as it will be seen shortly, they also function to return platform 50 to its normal position after the animal has left the platform 50. A U-shaped member 91 is attached to the plate 89 in a manner to provide an eyelet for receiving a chain 92, the same being only partially shown, which is connected at one end to the member 91 and its other end to the I bolt 65. Of course, a suitable connecting means such as a rod or link could be utilized to provide a connection between plate 89 and I bolt 65.

With the cylinder 85 in its raised position fluid is drawn from reservoir 70 into cylinder 80. When one of the animals steps upon the platform 50 the fluid in cylinder 80 is pressurized but not discharged at this time because a valve 110 is closed at this time. The valve 110 is connected to the discharge side of cylinder 80 by means of a fluid conductor 95. A check valve 96 is located at the discharge side of cylinder 80 to prevent fluid from flowing back therein. Fluid is also supplied over conductor 95 from the other cylinder 80 which is provided with a similar check valve 96 at its discharge side.

As the animal continues to walk upon platform 50 it will engage member 40 of trigger mechanism 30 with its body. The member 40, in this example, is a metal loop extending transversely into the spray chute 10 from the outside of side 25 through opening 26 which extends longitudinally across the entire side 25 and into spray chute 10. The member 40 could be a solid member, however, the metal rod formed in the shape of a loop is quite satisfactory.

Figure 4:
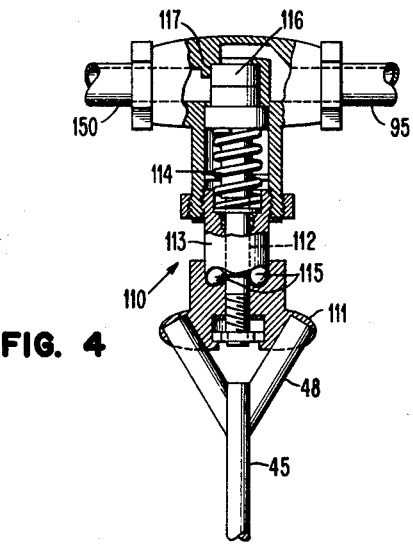
FIGURE 4 is a fragmentary view partially in section showing the connection between the trigger mechanism and the valve mechanism for controlling the discharge of the fluid to be sprayed.

In order to prevent damage to the trigger mechanism 30 the member 40 is fastened to a spring 41 which functions as a link between member 40 and a rod 45. The rod 45 is suitably journaled in brackets 46 which extend from a support member 47, the support member 47 being secured to the outside of side 25. The rod 45 terminates at its other end in a Y-shaped member 48. The Y-shaped member 48 engages a handle 111 of valve 110. The details of valve 110 are shown in FIG. 4, but suffice it to say at this time, the valve 110 is a spring operated self closing valve. The discharge side of valve 110 is connected to a fluid conductor 150 which functions to conduct the fluid to a plurality of suitably space sprayd nozzles 160. The nozzles 160 are discretely positioned and disposed at the proper angle to provide the best spray pattern for completely spraying the animals.

Hence, from the foregoing it is seen that an animal may enter the spray chute 10 from either end and in this example the animal is shown as having entered from the left hand end of the spray chute 10. As the animal mounts the platform 50, the platform 50 pivots downwardly and in doing so fluid is pressurized in cylinders 80 and in fluid conductor 95. The valve 110 is closed at this time and as the fluid will be pressurized until there is a balance between the weight of the animal and the fluid under pressure. As the animal continues its forward progress in the spray chute 10, its body engages the member 40 of trigger mechanism 30 and pivots the same clockwise as shown in FIG. 1, to the dashed line position. In doing so the valve 110 is opened and the fluid under pressure in cylinders 80 and fluid conductors 95 is permitted to flow to the nozzles 160 via the fluid conductor 150. The fluid will be pumped from the cylinders 80 as the platform 50 further descends under the weight of the animal. Hence, fluid under pressure will be discharged as a spray from nozzles 160 upon the animal, and particularly, only after the animal has properly positioned itself within the spray chute 10.

After the animal leaves the spray chute 10 the springs 90 return the platform 50 to its raised position and also move piston 85 to its upper position, and in doing so, fluid is drawn from reservoir 70 into the cylinders 80. The height to which platform 50 is returned depends upon how far the I bolts 65 are threaded into brackets 60. Of course, the upper end of cylinders 80 is a limiting factor.

The valve 110 can be any suitable valve which will be moved to the open position after the member 40 is permitted to return to its normal position. Whether or not the spring for returning member 40 to its normal position is contained within the valve 110 or is connected between rod 45 and supports 46 is relatively immaterial. The valve 110, FIG. 4, used in this example is of the type commonly used for controlling drinking fountains. As the handle 111 is rotated, the stem 112 which is attached to the handle 111 is raised due to the camming action of cylinder 113. The spring 114 functions to hold the valve in its normally closed position. The spring 114 essentially causes cam followers 115 to be seated in the position shown. The cam followers 115 are attached to the stem 112. Hence, when the handle 111 is rotated, the stem 112 is raised, lifting seat washer 116 from its seat 117.

In order to insure that only one animal is in the spray chute 10 at a time, a pivotally mounted gate or bar, not shown, operated from the motion of the platform 50 could be brought into position to block entry into the spray chute 10 once one of the cattle has become fully positioned upon the platform 50.

From the foregoing it is seen that this invention provides an automatic cattle sprayer. Further it is seen that the cattle themselves function to pressurize he fluid to be sprayed and thereafter, when upon being properly positioned with the spray chute, actuate the trigger mechanism for releasing the fluid under pressure to the spray nozzles. This arrangement not only makes the apparatus fully automatic but is relatively inexpensive.

The foregoing is considered as being illustrative only and numerous modifications and changes will readily occur to those skilled in the art. It is not intended to limit the invention to the exact construction and operation shown and described and therefore modifications and equivalents may be resorted to, but these will fall within the scope of the invention as claimed.

What is claimed is:

1. Automatic cattle spraying apparatus comprising:
   a spray chute open at opposite ends to provide a walkway for cattle,
   a pump having an inlet connected to receive fluid from a reservoir and an outlet,
   a platform disposed within said spray chute and operably connected to activate said pump under the weight of said cattle,
   a valve for controlling the discharge of fluid from said pump,
   a plurality of spray nozzles suitably disposed to spray said cattle as they pass through said spray chute,
   means connecting the outlet of said pump to said control valve,
   means connecting said control valve to said spray nozzles, and
   means operable by said cattle for opening said control valve upon the cattle arriving at a predetermined position within said spray chute whereby the fluid pressurized by said pump under action of said platform is discharged from said nozzles upon opening of said valve.

2. The automatic cattle spraying apparatus of claim 1, wherein said platform is pivotally mounted at one end thereof.

3. The automatic cattle spraying apparatus of claim 1 wherein said means operable for opening said valve comprises:
- a pivotally mounted arm disposed within said spray chute intermediate the ends thereof to be engaged by said cattle so as to be pivoted thereby, and
- connecting means for connecting said arm to said valve whereby when said arm is pivoted by said cattle the valve is opened.

4. The automatic cattle spraying apparatus of claim 3 wherein said connecting means comprises:
- a rigid member connected at one end to said valve, and
- a flexible member connected between said rigid member and said arm to permit said cattle to move said arm in addition to pivoting said arm without damage to said arm and said rigid member.

References Cited by the Examiner
UNITED STATES PATENTS

| | | | |
|---|---|---|---|
| 993,432 | 5/11 | Young et al. | 103—308 |
| 1,233,286 | 7/17 | Bonney | 119—159 |
| 1,273,311 | 7/18 | Barnes | 119—159 |
| 1,460,561 | 7/23 | Peterson | 119—159 |
| 2,020,063 | 11/35 | Kalina | 119—159 |
| 2,316,932 | 4/43 | Bruce | 119—159 |
| 3,051,128 | 8/62 | McKinley | 119—157 |

References Cited by the Applicant
UNITED STATES PATENTS

| | | |
|---|---|---|
| 1,055,289 | 3/13 | Nolan. |
| 1,113,180 | 10/14 | Andrews. |
| 1,161,569 | 11/15 | Winning. |
| 2,542,280 | 2/51 | Knapp. |
| 2,652,810 | 9/53 | Paul. |
| 3,032,011 | 5/62 | Stramel. |

SAMUEL KOREN, *Primary Examiner.*

ALDRICH F. MEDBERY, *Examiner.*